(12) United States Patent
Ahn et al.

(10) Patent No.: US 10,013,070 B2
(45) Date of Patent: Jul. 3, 2018

(54) SYSTEM AND METHOD FOR RECOGNIZING HAND GESTURE

(71) Applicant: Korea Electronics Technology Institute, Seongnam-si, Gyeonggi-do (KR)

(72) Inventors: Yang Keun Ahn, Seoul (KR); Young Choong Park, Goyang-si (KR)

(73) Assignee: Korea Electronics Technology Institute, Seongnam-si (KR)

( * ) Notice: Subject to any disclaimer, the term of this patent is extended or adjusted under 35 U.S.C. 154(b) by 0 days.

(21) Appl. No.: 15/273,386

(22) Filed: Sep. 22, 2016

(65) Prior Publication Data

US 2017/0285759 A1 Oct. 5, 2017

(30) Foreign Application Priority Data

Mar. 29, 2016 (KR) ........................ 10-2016-0037571

(51) Int. Cl.
*G06F 3/01* (2006.01)
*G06F 3/00* (2006.01)
*G06T 7/00* (2017.01)

(52) U.S. Cl.
CPC .............. *G06F 3/017* (2013.01); *G06F 3/005* (2013.01); *G06T 7/0042* (2013.01); *G06T 2207/10028* (2013.01); *G06T 2207/30196* (2013.01)

(58) Field of Classification Search
CPC .......... G06F 2203/041; G06F 3/03547; G06F 3/041; G06F 3/0412; G06F 3/0414; G06F 3/0416; G06F 3/0418; G06F 3/046; G06F 3/047; G06F 3/017; G06F 3/005; H05K 9/0073; H05K 9/0079; H05K 9/0081; H05K 9/0088; G06T 7/0042; G06T 2207/30196; G06T 2207/10028
USPC .................................................. 345/156–173
See application file for complete search history.

(56) References Cited

U.S. PATENT DOCUMENTS

| | | | | |
|---|---|---|---|---|
| 6,002,808 A * | 12/1999 | Freeman | ................. | G06F 3/017 348/171 |
| 6,323,846 B1 * | 11/2001 | Westerman | ........... | G06F 3/0235 345/173 |
| 6,788,809 B1 * | 9/2004 | Grzeszczuk | ............ | G06F 3/017 345/419 |
| 9,213,890 B2 * | 12/2015 | Huang | .................... | G06F 3/017 |
| 9,696,808 B2 * | 7/2017 | Nishihara | ............... | G06F 3/017 |

(Continued)

FOREIGN PATENT DOCUMENTS

| KR | 10-2006-0065197 A | 6/2006 |
|---|---|---|
| KR | 10-2016-0025823 A | 3/2016 |

OTHER PUBLICATIONS

Office Action dated Nov. 23, 2016 in corresponding Korean Application No. 10-2016-0037571, filed Mar. 29, 2016.

*Primary Examiner* — Grant Sitta
(74) *Attorney, Agent, or Firm* — Knobbe, Martens, Olson & Bear, LLP (57) ABSTRACT

Provided is a hand gesture recognition technique. A hand gesture recognition system according to one aspect of the present invention includes an image capturing unit that captures an image of a gesture recognition region to acquire a depth image; a hand region extractor that extracts a hand region from the depth image; and a hand gesture recognizer that analyzes the extracted hand region to recognize a hand gesture included in the depth image as a grasp gesture or a release gesture.

6 Claims, 6 Drawing Sheets

(56) References Cited

U.S. PATENT DOCUMENTS

| | | | | |
|---|---|---|---|---|
| 2006/0010400 A1* | 1/2006 | Dehlin | G06F 3/0354 | 715/856 |
| 2008/0244465 A1* | 10/2008 | Kongqiao | G06F 3/017 | 715/863 |
| 2009/0096783 A1* | 4/2009 | Shpunt | G01B 11/25 | 345/419 |
| 2012/0274589 A1* | 11/2012 | De Angelo | G06F 3/011 | 345/173 |
| 2013/0127705 A1* | 5/2013 | Jung | G06F 3/0304 | 345/156 |
| 2014/0267009 A1* | 9/2014 | DeLean | G06F 3/017 | 345/156 |
| 2014/0363088 A1* | 12/2014 | Cha | G06K 9/00382 | 382/195 |
| 2015/0003682 A1* | 1/2015 | Kondou | G06F 3/017 | 382/103 |
| 2015/0015490 A1* | 1/2015 | Ahn | G06F 3/011 | 345/166 |
| 2015/0026646 A1* | 1/2015 | Ahn | G06K 9/00201 | 715/863 |
| 2015/0055836 A1* | 2/2015 | Moteki | G06K 9/00355 | 382/124 |
| 2015/0138078 A1* | 5/2015 | Krupka | G06K 9/00389 | 345/156 |
| 2015/0139487 A1* | 5/2015 | Aliseychik | G06K 9/00389 | 382/103 |
| 2015/0220149 A1* | 8/2015 | Plagemann | G06F 3/017 | 715/856 |
| 2015/0242683 A1* | 8/2015 | Tang | G06K 9/00389 | 382/173 |
| 2015/0253863 A1* | 9/2015 | Babin | G06F 3/017 | 345/156 |
| 2015/0253864 A1* | 9/2015 | Parkhomenko | G06F 3/017 | 345/156 |
| 2015/0278589 A1* | 10/2015 | Mazurenko | G01C 11/30 | 382/103 |
| 2015/0294142 A1* | 10/2015 | Gruenwald | G01S 17/50 | 348/46 |
| 2016/0026857 A1* | 1/2016 | Petyushko | G06K 9/481 | 382/103 |
| 2016/0078289 A1* | 3/2016 | Michel | G06T 7/73 | 345/156 |
| 2016/0132121 A1* | 5/2016 | Murase | G06T 7/73 | 345/156 |
| 2016/0239080 A1* | 8/2016 | Marcolina | G06F 3/011 | |
| 2017/0060254 A1* | 3/2017 | Molchanov | G06F 3/011 | |
| 2017/0153711 A1* | 6/2017 | Dai | G06F 3/017 | |
| 2017/0192515 A1* | 7/2017 | Menadeva | G06F 3/017 | |

* cited by examiner

(a) DEPTH IMAGE (b) ADAPTIVE BINARIZATION (c) DETECTED GESTURE RECOGNITION REGION

FIG. 6

(a) DEPTH IMAGE (b) ADAPTIVE BINARIZATION (c) DETECTED GESTURE RECOGNITION REGION

FIG. 7

SYSTEM AND METHOD FOR RECOGNIZING HAND GESTURE

CROSS-REFERENCE TO RELATED APPLICATION

This application claims priority to and the benefit of Korean Patent Application No. 10-2016-0037571, filed on Mar. 29, 2016, the disclosure of which is incorporated herein by reference in its entirety.

BACKGROUND

1. Field of the Invention

The present invention relates to a hand gesture recognition technique, and more particularly, to a hand gesture recognition system capable of increasing a recognition rate by recognizing a hand gesture on the basis of an image of an entire hand, and a method of recognizing a hand gesture.

2. Discussion of Related Art

Recently, techniques that enable intuitive interaction methods by estimating poses and gestures of a body are being applied to various application fields such as games, robots, education, media, and surveillance. The above techniques are being utilized in combination with action recognition, intention recognition, computer vision, virtual reality, augmented reality, and the like.

Particularly, with the development of smart information technology (IT) devices, hand gesture recognition is attracting attention as a method of efficiently and naturally interacting and information-exchanging between a user and such devices.

Particularly, vision-based gesture recognition has an advantage in performing recognition without additional cost by using an image capturing device installed by default in an apparatus without additional devices such as a keyboard and a mouse in a conventional computer. Therefore, vision-based gesture recognition is being widely studied for use in controlling robots, computer games, smart television sets, smart phones, and the like.

In a conventional vision-based recognition technique, there is a technique of recognizing grasp and release gestures on the basis of a hand image acquired using a depth camera. Such a technique conventionally recognizes grasp and release gestures on the basis of an image of two fingers of a thumb and an index finger.

Such recognition of grasp and release gestures based on the two fingers has a problem in that an error rate is high.

SUMMARY OF THE INVENTION

The present invention is directed to providing a hand gesture recognition system capable of increasing a recognition rate by recognizing a hand gesture on the basis of an entire hand image and a method of recognizing a hand gesture.

One aspect of the present invention provides a hand gesture recognition system including: an image capturing unit that captures an image of a gesture recognition region to acquire a depth image; a hand region extractor that extracts a hand region from the depth image; and a hand gesture recognizer that analyzes the extracted hand region to recognize a hand gesture included in the depth image as a grasp gesture or a release gesture.

The hand region extractor may primarily binarize the depth image, determine a hand region from the primarily binarized depth image, secondarily binarize the determined hand region, and finally extract the hand region.

The hand region extractor may be provided to perform general binarization as the primary binarization and to perform adaptive binarization as the secondary binarization.

The hand region extractor may compare hand region candidates detected by applying a labeling algorithm to the primarily binarized depth image and a preset threshold, and determine a hand region candidate which is greater than or equal to the threshold as the hand region.

When the number of the hand regions candidates is two or more, the hand region extractor may determine the two biggest hand region candidates as the hand regions.

When the number of the hand region candidates is less than two, the hand region extractor may determine the detected hand region candidates as the hand regions.

When there are no candidates greater than or equal to the threshold in the hand region candidates, the hand region extractor may determine there are no hand regions in the depth image.

The hand region recognizer may adaptively binarize the extracted hand region to detect gesture recognition regions, and recognize the hand gesture as a release gesture or a grasp gesture on the basis of the number of the extracted gesture recognition regions.

The hand gesture recognizer may determine whether the number of the gesture recognition regions is greater than or equal to a set value, and, when the number of the gesture recognition regions is greater than or equal to the set value, recognize the hand gesture as a release gesture, and when the number of the gesture recognition regions is less than the set value, recognize the hand gesture as a grasp gesture.

Another aspect of the present invention provides a method of recognizing a hand gesture including: acquiring a depth image by capturing an image of a gesture recognition region; analyzing the depth image and determining whether a hand region is extracted; detecting gesture recognition regions by adaptively binarizing an extracted hand region when the hand region is extracted; and recognizing a hand gesture included in the depth image as a release gesture or a grasp gesture on the basis of the number of the extracted gesture recognition regions.

The determining of whether a hand region is extracted may include primarily binarizing the depth image, determining a hand region from the primarily binarized depth image, secondarily binarizing the determined hand region, and finally extracting the hand region.

In the determining of whether a hand region, the primary binarization may be general binarization and the secondary binarization may be adaptive binarization.

The determining of whether a hand region is extracted may include comparing hand region candidates detected by applying a labeling algorithm to the primarily binarized depth image and a preset threshold, and determining a hand region candidate which is greater than or equal to the threshold as the hand region.

The determining of whether a hand region is extracted may include determining the two biggest hand region candidates as the hand regions when it is determined that the number of the hand region candidates is two or more.

The determining of whether a hand region is extracted may include determining the detected hand region candidate as the hand region when it is determined that the number of the hand region candidates is less than two.

The determining of whether a hand region is extracted may include determining there are no hand regions in the depth image when there are no candidates greater than or equal to the threshold in the hand region candidates.

The recognizing may include determining whether the number of the gesture recognition regions is greater than or equal to a preset value, and, when the number of the gesture recognition regions is greater than or equal to the preset value, recognizing the hand gesture as a release gesture, and when the number of the gesture recognition regions is less than the preset value, recognizing the hand gesture as a grasp gesture.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Advantages and features of the present invention, and methods of achieving the same should be clearly understood with reference to the accompanying drawings and the following detailed embodiments. However the present invention is not limited to the embodiments which will be disclosed, but may be implemented in various different forms. The embodiments are provided in order to fully explain the present invention and fully explain the scope of the present invention to those skilled in the art. The scope of the present invention is defined by the appended claims. In the present invention, the same reference number refers to the same component in the drawings.

When embodiments of the invention are described, detailed descriptions of known technology related to the present invention will be omitted when they are determined to unnecessarily obscure the subject matter of the invention.

Some terms described below are defined by considering functions in embodiments of the invention, and meanings may vary depending on a user or operator's intentions or customs.

Hereinafter, a system and method of recognizing hand gestures according to an embodiment of the present invention will be described in detail with reference to the accompanying drawings.

Figure 1:
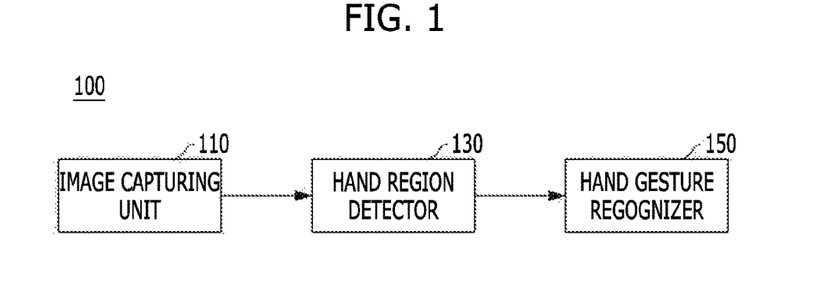
FIG. 1 is a block diagram illustrating a configuration of a hand gesture recognition system according to an embodiment of the present invention.
Figure 2:
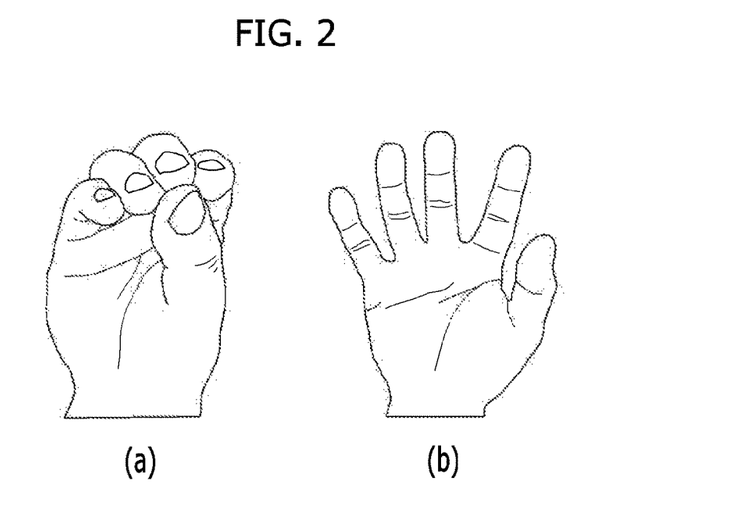
FIG. 2 is a view illustrating one example of hand gestures recognized by the hand gesture recognition system according to the embodiment of the present invention.

FIG. 1 is a block diagram illustrating a configuration of a hand gesture recognition system according to an embodiment of the present invention, and as FIG. 2 is a view illustrating one example of hand gestures recognized by the hand gesture recognition system according to the embodiment of the present invention, FIG. 2A is a view illustrating an example of a grasp gesture and FIG. 2B is a view illustrating an example of a release gesture.

Referring to FIG. 1, a hand gesture recognition system 100 (hereinafter, referred to as a "system") is provided to extract a hand region from an acquired image and to recognize a hand gesture on the basis of the extracted hand region. Here, the system 100 recognizes a hand gesture on the basis of a depth image.

To this end, the system 100 may include an image capturing unit 110, a hand region extractor 130, and a hand gesture recognizer 150. However, the above-described configuration of the system is merely one example, and the system 100 may further include other components in addition to the above-mentioned configuration.

The image capturing unit 110 is provided to acquire an image of an allocated region to capture a depth image. Here, the region of which an image is captured by the image capturing unit 110 becomes a gesture recognition region.

In addition, a user who wants to use the system 100 positions his or her hands in the gesture recognition region so that his or her palms face the image capturing unit 110.

Here, the user may also position one hand or both hands of his or her left and right hands for a desired objective.

The hand region extractor 130 extracts a hand region from the depth image acquired by the image capturing unit 110. The number of the hand regions extracted by the hand region extractor 130 may be one or two.

That is, when the user positions one hand in the gesture recognition region, the hand region extractor 130 extracts one hand region, and when the user positions both hands in the gesture recognition region, the hand region extractor 130 extracts two hand regions.

First, the hand region extractor 130 binarizes the depth image provided by the image capturing unit 110, and at this point, general binarization may be used.

In addition, the hand region extractor 130 determines a hand region from the binarized depth image. At this point, the hand region extractor 130 compares a region detected through a labeling algorithm (a detected region) and a preset threshold and determines the region as a hand region when the region is greater than or equal to the threshold.

Here, the region detected through the labeling algorithm may not exist or may exist in a plurality of regions.

When there are no regions greater than or equal to the threshold among regions detected through the labeling algorithm, the hand region extractor 130 determines that there are no hand regions in the depth image acquired by the image capturing unit 110.

In addition, when there are two or more detected regions greater than or equal to the threshold, the hand region extractor 130 determines the two biggest regions as hand regions among the detected regions.

Meanwhile, when the hand regions are determined, the hand region extractor 130 adaptively binarizes the determined hand regions to remove wrists and extracts final hand regions.

The hand gesture recognizer 150 analyzes the hand regions provided from the hand region extractor 130 to recognize a hand gesture and recognizes whether the hand gesture is a release gesture or grasp gesture.

Here, as a result of an analysis of the hand regions, when the hand regions are in a shape like that of FIG. 2A, the hand gesture recognizer 150 recognizes the hand region as a grasp gesture, and when the hand regions are in a shape like that of FIG. 2B, the hand gesture recognizer 150 recognizes the hand regions as a release gesture.

Specifically, the hand gesture recognizer 150 binarizes the hand regions provided from the hand region extractor 130 to detect masses. In the present invention, since masses are regions for recognizing a gesture, the masses may be defined as gesture recognition regions.

Then, after the gesture recognition regions are detected, when the number of the gesture recognition regions is three or more, the hand gesture recognizer 150 recognizes a hand gesture as a release gesture, and when the number of the gesture recognition regions is two or less, the hand gesture recognizer 150 recognizes a hand gesture as a grasp gesture.

In the above description, the configuration and function of the hand gesture recognition system according to the embodiment of the present invention has been described. Hereinafter, a method of recognizing a hand gesture using the hand gesture recognition system according to the embodiment of the present invention will be specifically described in detail with reference to the accompanying drawings.

Figure 3:
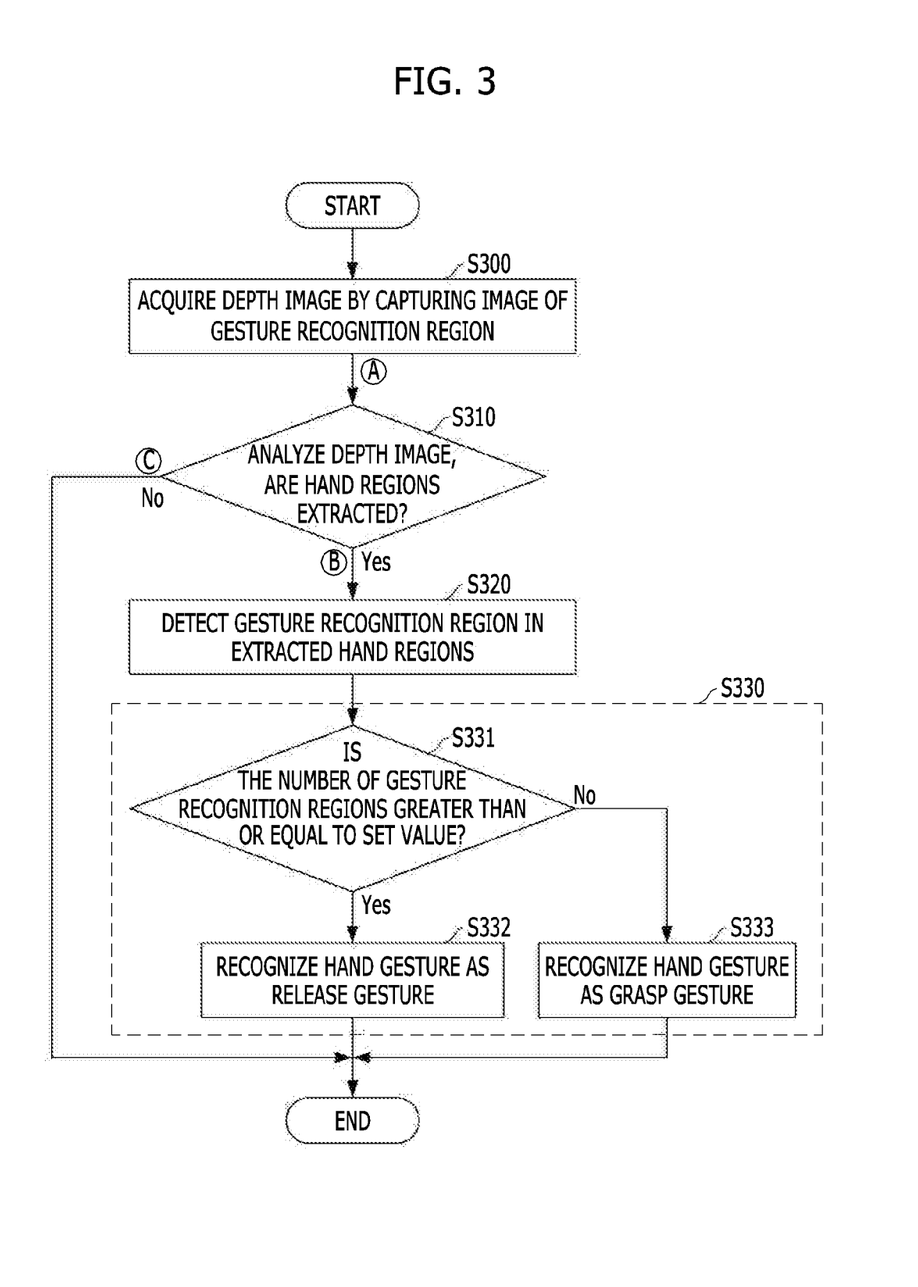
FIG. 3 is a flowchart illustrating a process of recognizing a hand gesture according to a method of recognizing a hand gesture in the embodiment of the present invention.

FIG. 3 is a flowchart illustrating a process of recognizing a hand gesture according to a method of recognizing a hand gesture in the embodiment of the present invention.

Referring to FIG. 3, first, the image capturing unit 110 captures an image of a gesture recognition region to acquire a depth image (S300), and the depth image acquired by the image capturing unit 110 is provided to the hand region extractor 130.

Figure 4A:
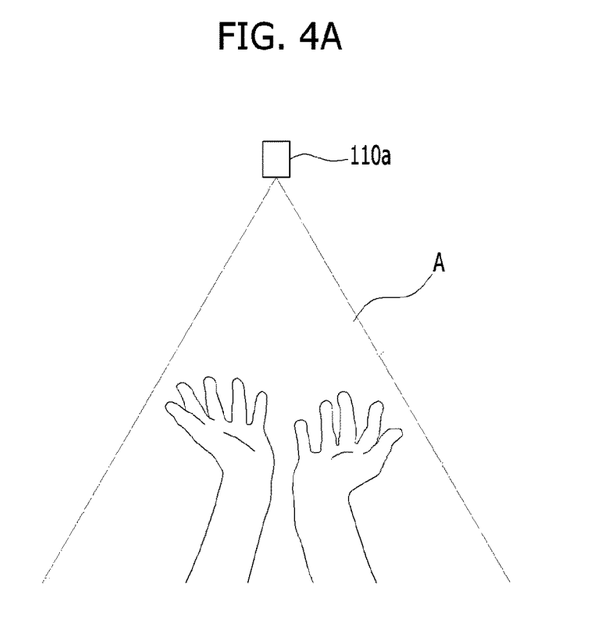
FIG. 4A is a view illustrating one example in which an image capturing unit captures an image of hands positioned below the image capturing unit.
Figure 4B:
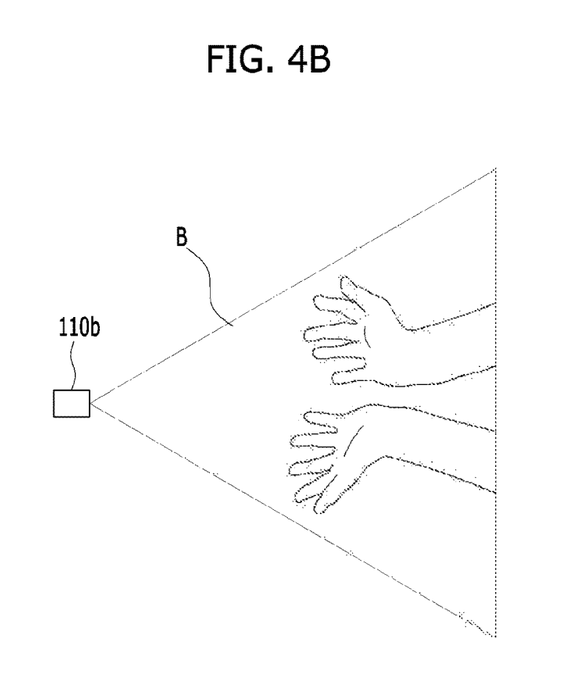
FIG. 4B is a view illustrating another example in which an image capturing unit captures an image of hands positioned in front of the image capturing unit.

FIG. 4 is a view illustrating one example in which the image capturing unit 110 captures an image of hands in a gesture recognition region, FIG. 4A is a view illustrating one example in which an image capturing unit 110a captures an image of hands positioned below the image capturing unit 110a, and FIG. 4B is a view illustrating another example in which an image capturing unit 110b captures an image of hands positioned in front of the image capturing unit 110b.

Here, a user who wants to use the system 100 positions his or her hands in a gesture recognition region A or B so that his or her palms face upward. Here, the user may position one hand or both hands of his or her right and left hands for a desired objective.

Then, the hand region extractor 130 analyzes the acquired depth image to determine whether a hand region is extracted (S310). Here, a specific operation related to an operation of extracting hand regions in operation S310 will be described below.

When it is determined that the hand region is not extracted as a result of operation S310 (No in S310), a hand gesture recognition operation is completed.

Conversely, when it is determined that hand regions are extracted as the result of operation S310 (Yes in S310), the hand gesture recognizer 150 adaptively binarizes the extracted hand regions to detect gesture recognition regions (S320)

After operation S320, the hand gesture recognizer 150 recognizes whether a hand gesture included in the depth image acquired in operation S300 is a release gesture or grasp gesture on the basis of the number of the detected gesture recognition regions (S330).

Here, the hand gesture recognizer 150 determines whether the number of the gesture recognition regions is greater than or equal to a set value through a comparison of the number of the detected gesture recognition regions and the set value which is preset (S331). When the gesture recognition regions is greater than or equal to the set value (Yes in S331), the hand gesture recognizer 150 determines the hand gesture as a release gesture (S332), and when the number of the gesture recognition regions is less than the set value (No in S331), the hand gesture recognizer 150 recognizes the hand gesture as a grasp gesture (S333)

For example, in a case in which the set value is three, when the number of the gesture recognition regions is three or more, the hand gesture recognizer 150 recognizes the hand gesture as a release gesture, and when the number of the gesture recognition regions is two or less, the hand gesture recognizer 150 recognizes the hand gesture as a grasp gesture.

Figure 5:
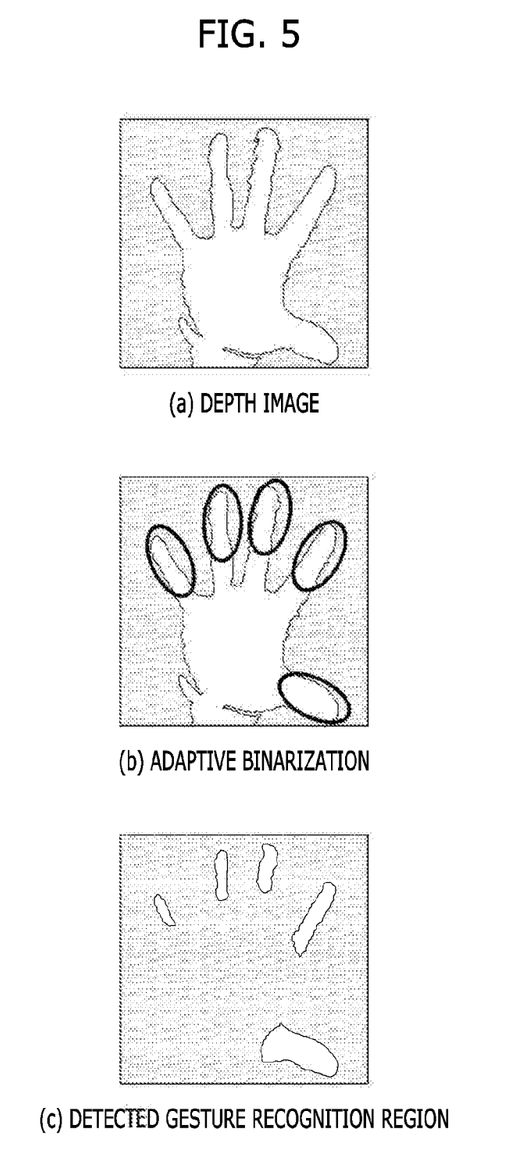
FIG. 5 is a view illustrating one example of an operation in which a hand gesture recognizer according to the embodiment of the present invention detects a gesture recognition region.
Figure 6:
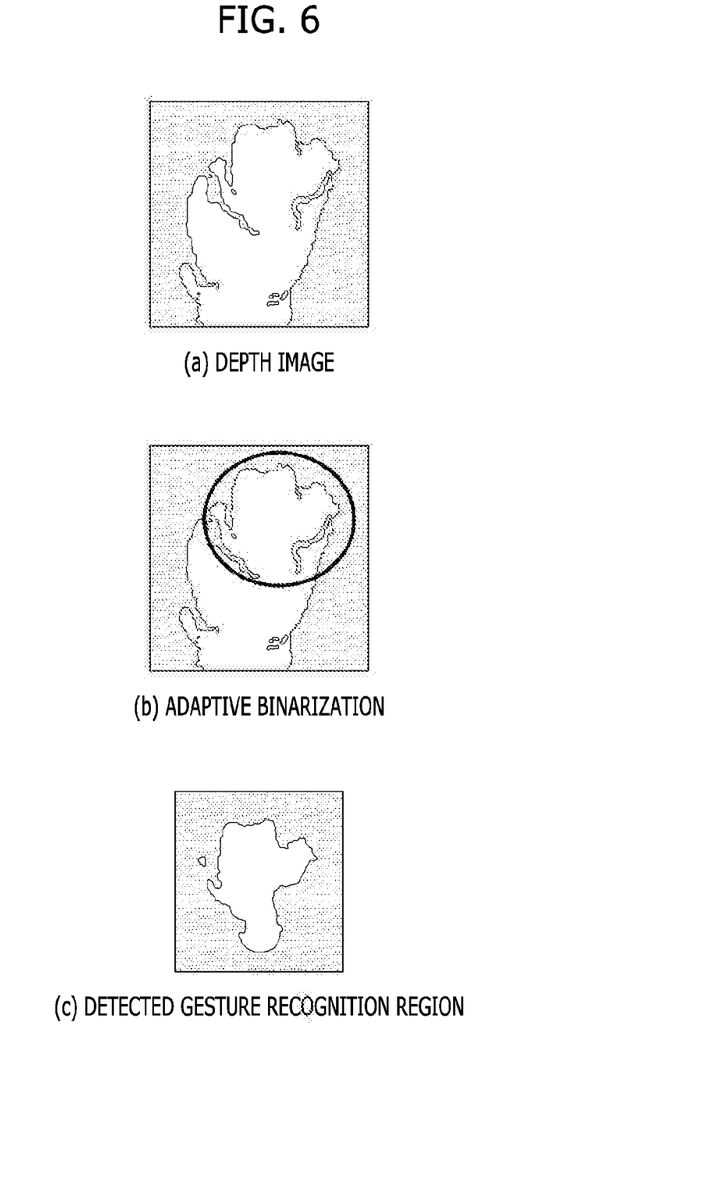
FIG. 6 is a view illustrating another example of an operation in which the hand gesture recognizer according to the embodiment of the present invention detects a gesture recognition region.

FIG. 5 is a view illustrating one example of an operation in which a hand gesture recognizer according to the embodiment of the present invention detects a gesture recognition region, and FIG. 6 is a view illustrating another example of an operation in which a hand gesture recognizer according to the embodiment of the present invention detects a gesture recognition region.

As illustrated in FIG. 5, when a depth image illustrated in FIG. 5A is adaptively binarized as in FIG. 5B and gesture recognition regions having a shape in FIG. 5C are detected, the hand gesture recognizer 150 recognizes a hand gesture included in the depth image as a release gesture.

Alternatively, as illustrated in FIG. 6, when a depth image illustrated in FIG. 6A is adaptively binarized as in FIG. 6B and gesture recognition regions having a shape in FIG. 6C are detected, the hand gesture recognizer 150 recognizes a hand gesture included in the depth image as a grasp gesture.

In the above description, an overall process of the method of recognizing a hand gesture using the hand gesture recognition system according to the embodiment of the present invention has been specifically described with reference to the accompanying drawings. Hereinafter, the operation of extracting the hand region in operation S310 in the method of recognizing a hand gesture will be specifically described.

Figure 7:
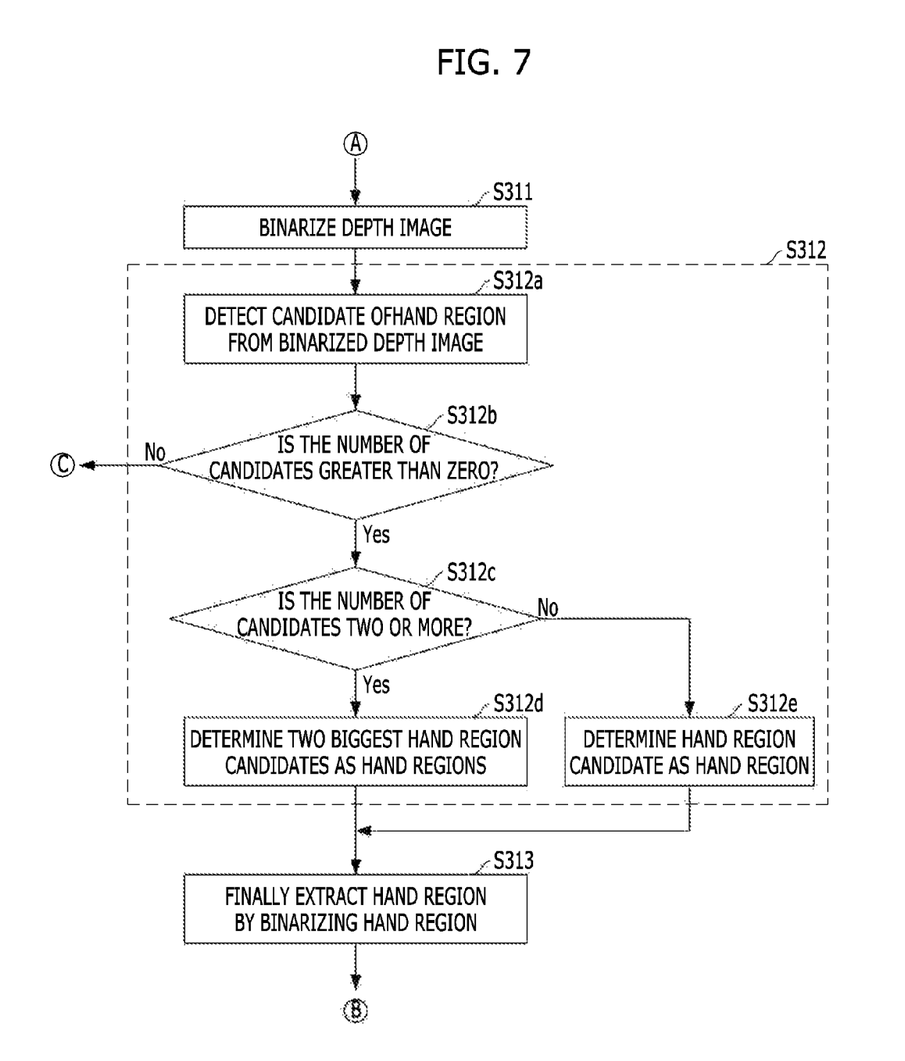
FIG. 7 is a flowchart illustrating an order of operations for extracting hand regions according to the embodiment of the present invention.

FIG. 7 is a flowchart illustrating an order of operations for extracting hand regions according to the embodiment of the present invention.

Referring to FIG. 7, the hand region extractor 130 binarizes a depth image acquired in operation S300 (S311), and the binarization performed in operation S311 may be general binarization.

After operation S311, the hand region extractor 130 determines hand regions from the binarized depth image (S312).

Specifically, the hand region extractor 130 applies a labeling algorithm to the binarized depth image to detect hand region candidates (S312a). Here, the hand region candidates are regions greater than a preset threshold among regions that are detected by applying the labeling algorithm, and are compared to the preset threshold.

After operation S312a, the hand region extractor 130 determines whether the number of the hand region candidates is greater than zero (S312b), and when the number of the hand region candidates is not greater than zero (No in S312b), that is, in a case in which no hand region candidate is detected, since there are no hand regions in the depth image, the hand gesture recognition process is finished.

Conversely, when the number of the hand region candidates is greater than zero as a result of the determination in operation S312b (Yes in S312b), whether the number of the hand region candidates is two or more is determined (S312c).

When it is determined that the number of the hand region candidates is two or more as a result of operation S312c (Yes in S312c), the hand region extractor 130 determines the two biggest hand regions as hand regions (S312d).

Meanwhile, when it is determined that the number of the hand region candidates is two or more as a result of operation S312c (No in S312c), the hand region extractor 130 determines the hand region candidate as a hand region (S312e).

When the hand regions are determined through such operations, the hand region extractor 130 binarizes the determined hand regions to remove wrists, and extracts final hand regions (S313). The binarization performed in operation S313 may be adaptive binarization.

Meanwhile, although the hand gesture recognition system and method are described according to embodiments of the present invention, the scope of the present invention is not limited to specific embodiments, and it should be clear to those skilled in the art that several alternatives, modifications, and changes can be performed without departing the scope of the present invention.

Since grasp and release gestures are conventionally recognized on the basis of two fingers, many errors have occurred. However, in the present invention, since it is determined whether a hand gesture is a grasp gesture or a release gesture by recognizing an entire hand, a recognition rate of a hand gesture can be increased.

In addition, when a device is controlled using a hand recognition technique of the present invention, the corresponding device can be more accurately controlled.

Therefore, the embodiments and the accompanying drawings of the present invention are considered in a descriptive sense only and not for purposes of limitation. The scope of the present invention is not limited by these embodiments and the accompanying drawings. The scope of the present invention should be understood as being interpreted by the appended claims and encompassing the scopes of equivalent technologies.

What is claimed is:

1. A system for recognizing a hand gesture using digital image processing, the system comprising:
   an image capturing device configured to capture an image of a gesture recognition region to acquire a depth image;
   a hand region extraction processor configured to extract a hand region from the depth image; and
   a hand gesture recognition processor configured to analyze the extracted hand region to recognize a hand gesture included in the depth image as a grasp gesture or a release gesture, wherein the hand region recognition processor is further configured to primarily binarize the depth image, determine a hand region from the primarily binarized depth image, secondarily binarize the determined hand region, and finally extract the hand region,
   wherein the hand region extraction processor is further configured to compare hand region candidates detected by applying a labeling algorithm to the primarily binarized depth image and a preset threshold, and determine a hand region candidate which is greater than or equal to the threshold as the hand region,
   wherein the hand region recognition processor is further configured to adaptively binarize the extracted hand region to detect gesture recognition regions respectively corresponding to different fingers, and recognize the hand gesture as a release gesture or a grasp gesture on the basis of a number of the extracted gesture recognition regions, and
   wherein the hand gesture recognition processor is further configured to recognize a hand gesture as a release gesture when the number of the gesture recognition regions is three or more, and wherein the hand gesture recognition processor is further configured to recognize a hand gesture as a grasp gesture when the number of the gesture recognition regions is two or less.

2. A method of recognizing a hand gesture using digital image processing, the method comprising:
   acquiring a depth image by capturing an image of a gesture recognition region;
   analyzing the depth image and determining whether a hand region is extracted;
   detecting gesture recognition regions respectively corresponding to different fingers by adaptively binarizing an extracted hand region when the hand region is extracted; and
   recognizing a hand gesture included in the depth image as a release gesture or a grasp gesture on the basis of a number of the extracted gesture recognition regions,
   wherein the determining of whether a hand region is extracted includes primarily binarizing the depth image, determining a hand region from the primarily binarized depth image, secondarily binarizing the determined hand region, and finally extracting the hand region,
   wherein the determining of whether a hand region is extracted includes comparing hand region candidates detected by applying a labeling algorithm to the primarily binarized depth image and a preset threshold, and determining a hand region candidate which is greater than or equal to the threshold as the hand region,
   wherein the recognizing includes determining whether the number of the gesture recognition regions is greater than or equal to a preset value, and, when the number of the gesture recognition regions is greater than or equal to the preset value, recognizing the hand gesture as a release gesture, and when the number of the gesture recognition regions is less than the preset value, recognizing the hand gesture as a grasp gesture, and
   wherein the recognizing further includes i) recognizing a hand gesture as a release gesture when the number of the gesture recognition regions is three or more and ii) recognizing a hand gesture as a grasp gesture when the number of the gesture recognition regions is two or less.

3. The system of claim 1, wherein whether the hand gesture is the grasp gesture or the release gesture is determined by recognizing an entire hand to increase a recognition rate of a hand gesture.

4. The method of claim 2, wherein the recognizing further includes recognizing an entire hand to determine whether a hand gesture is a grasp gesture or a release gesture to increase a recognition rate of a hand gesture.

5. The system of claim 1, wherein the hand gesture recognition processor is further configured to recognize a hand gesture as a release gesture when the number of the gesture recognition regions is five.

6. The method of claim 2, wherein the recognizing further includes recognizing a hand gesture as a release gesture when the number of the gesture recognition regions is five.

\* \* \* \* \*